United States Patent
Sako et al.

(10) Patent No.: US 7,362,958 B2
(45) Date of Patent: Apr. 22, 2008

(54) DATA RECORDING METHOD, RECORDING APPARATUS, AND DATA OUTPUT METHOD

(75) Inventors: Yoichiro Sako, Tokyo (JP); Shunsuke Furukawa, Tokyo (JP)

(73) Assignee: Sony Corporation, Tokyo (JP)

( * ) Notice: Subject to any disclaimer, the term of this patent is extended or adjusted under 35 U.S.C. 154(b) by 979 days.

(21) Appl. No.: 10/275,737

(22) PCT Filed: Mar. 8, 2002

(86) PCT No.: PCT/JP02/02216

§ 371 (c)(1),
(2), (4) Date: Apr. 23, 2003

(87) PCT Pub. No.: WO02/073961

PCT Pub. Date: Sep. 19, 2002

(65) Prior Publication Data

US 2005/0152685 A1 Jul. 14, 2005

(30) Foreign Application Priority Data

Mar. 9, 2001 (JP) .............................. 2001-067460

(51) Int. Cl.
*H04N 5/76* (2006.01)

(52) U.S. Cl. .................... 386/111; 386/95; 386/125; 386/126; 386/69

(58) Field of Classification Search ........ 386/125–126, 386/109, 69, 95
See application file for complete search history.

(56) References Cited

U.S. PATENT DOCUMENTS

| 7,054,543 | B2 * | 5/2006 | Ando et al. ................... 386/95 |
| 7,181,125 | B2 * | 2/2007 | Nakano et al. ............... 386/68 |
| 7,231,132 | B1 * | 6/2007 | Davenport .................. 386/68 |

FOREIGN PATENT DOCUMENTS

| JP | 8-289248 | 11/1996 |
| JP | 10-51739 | 2/1998 |
| JP | 2001-28165 | 1/2001 |

* cited by examiner

*Primary Examiner*—Thai Q. Tran
*Assistant Examiner*—Helen Shibru
(74) *Attorney, Agent, or Firm*—Oblon, Spivak, McClelland, Maier & Neustadt, P.C.

(57) ABSTRACT

When packeting content data and recording the packeted content data to a recording medium having a plurality of sectors made up of at least a header and packet data, if a remaining data length of the last sector of the plurality of sectors to which the packeted content data is recorded is smaller than the data length of the header, supplementary data equivalent to the remaining data length of the last sector is generated and the generated supplementary data is added to the content data so as to packet and record the content data with the supplementary data added thereto.

8 Claims, 8 Drawing Sheets

DATA RECORDING METHOD, RECORDING APPARATUS, AND DATA OUTPUT METHOD

TECHNICAL FIELD

This invention relates to a data recording method and recording device for packeting content data and recording the packeted content data to a recording medium having a plurality of sectors made up of at least a header and packet data, a recording medium on which divided sectors with a predetermined length are provided and pack data made up of a header and packet data obtained by dividing data is recorded in these sectors, and a data transmission method for storing pack data into a packet and transmitting the data.

BACKGROUND ART

Figure 1A:
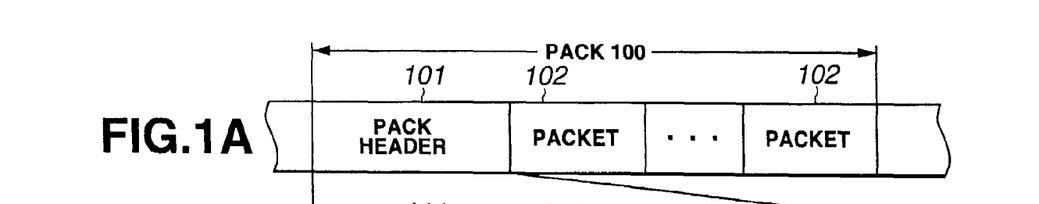
FIGS. 1A to 1F are views for explaining an MPEG2 data structure.

Conventionally, the MPEG (Moving Picture Experts Group) standard has been used for compressing content data and transmitting or recording the compressed content data. For example, an MPEG2 data structure will be described with reference to FIGS. 1A to 1F. First, an upper layer of the MPEG2 data structure is constituted by a pack header area 101 in which a pack header is stored, and a packet area 102 which follows the pack header area 101 and in which packeted content data is stored, as shown in FIG. 1A.

Figures 1B, 1C:
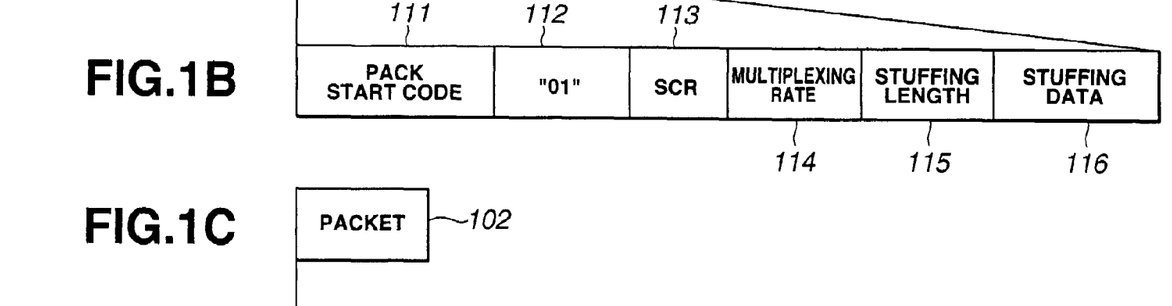

The pack header area 101 forms a header of a pack 100 made up of the pack header area 101 and a plurality of packet areas 102. Specifically, the pack header area 101 is constituted by a pack start area 111 in which a pack start code is stored, an identification data area 112 in which an identification code "01" for identifying from MPEG1 is stored, an SCR area 113 in which a system time reference value (system clock reference) is stored, a multiplexing rate area 114 in which the bit rate of this stream is stored, a stuffing length area 115 in which a stuffing length indicating the length of stuffing data is stored, and a stuffing area 116 in which stuffing data is stored, as shown in FIG. 1B.

Figure 1D:
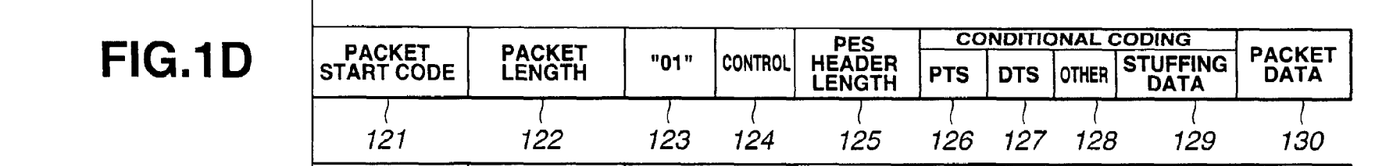

The first packet area 102 in which content data is stored is a PES (packet elementary stream) header. The first packet area 102 is constituted by a packet start code area 121 in which a leading part start code and stream ID of this packet area 102 are stored, a packet length area 122 in which the packet length of this packet area 102 is stored, an identification data area 123 in which an identification code "01" for identifying from MPEG1 is stored, a control area 124 in which a scrambling control flag, a control code and the like are stored, a PES header area 125 in which a PES header length is stored, a PTS area 126 in which PTS (presentation time stamp) is stored, a DTS area 127 in which DTS (decoding time stamp) is stored, an area 128 in which various data such as ESCR (elementary stream clock reference) are stored, a stuffing area 129 in which stuffing data is stored, and a packet data area 130 in which packeted content data is stored, as shown in FIGS. 1C and 1D.

Figure 1E:
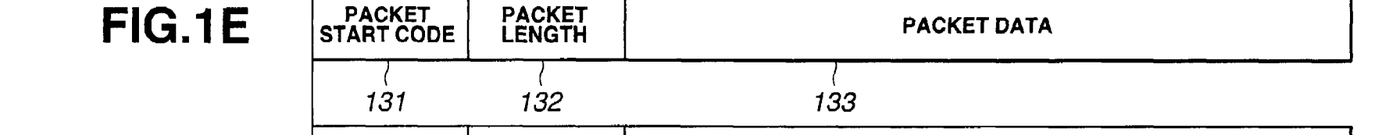
Figure 1F:
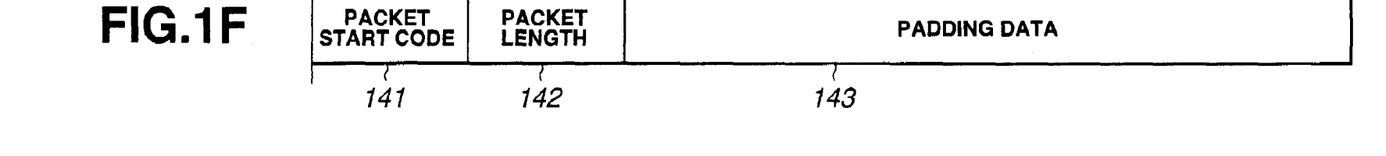

A packet area 102 at a halfway part of the content data is constituted by a packet start code area 131 in which a leading part start code and stream ID of the packet are stored, a packet length area 132 in which the packet length is stored, and a packet data area 133 in which packeted content data is stored, as shown in FIG. 1E. The last packet area 102 of the content data is constituted by a packet start code area 141 in which a leading part start code and stream ID of the packet are stored, a packet length area 142 in which the packet length is stored, and a padding area 143 in which padding data is stored, as shown in FIG. 1F.

The stuffing data stored in the stuffing area 116 of the packet header area 101 has a variable length. Therefore, the positions of the leading part of the packet and the control area 124 in which the scrambling control flag and the like are stored are deviated, making it difficult to perform control at the time of data reproduction and the like.

When content data is recorded by using this MPEG2 system to a recording medium such as an optical disc on which divided sectors with a predetermined length are provided, if the last part of the content data ends immediately before a sector boundary, the padding data cannot be stored into the last packet.

DISCLOSURE OF THE INVENTION

Thus, it is an object of the present invention to provide a data recording device, a data recording method and a data transmission method which enable secure storage of padding data even when content data ends immediately before a sector boundary.

It is another object of the present invention to provide a recoding medium which can store padding data even when content data ends immediately before a sector boundary.

In order to achieve the foregoing object, a data recording method according to the present invention comprises, when packeting content data and recording the packeted content data to a recording medium having a plurality of sectors made up of at least a header and packet data, the steps of: generating supplementary data equivalent to a remaining data length of the last sector of the plurality of sectors to which the packeted content data is recorded if the remaining data length of the last sector is smaller than the data length of the header; and adding the generated supplementary data to the content data and packeting the content data.

Moreover, in this recording method, the data length of the packeted content data is divided by the data length of the packet data to find a quotient and the remainder, and the result of subtraction of the found remainder from the data length of the packet data is compared with the data length of the header, thus discriminating whether or not the remaining data length of the last sector is smaller than the data length of the header.

A data recording method according to the present invention comprises, when packeting content data and recording the packeted content data to a recording medium having a plurality of sectors made up of at least a pack header, a PES (packetized elementary stream) header, packet data and padding data, the steps of: generating supplementary data equivalent to a remaining data length of the last sector of the plurality of sectors to which the packeted content data is recorded if the remaining data length of the last sector is smaller than at least the data length of the PES header; and adding the generated supplementary data to the content data and packeting the content data.

Moreover, a recording method according to the present invention comprises, when packeting content data and recording the packeted content data to a recording medium having a plurality of sectors made up of at least a pack header, a PES (packetized elementary stream) header, packet data and padding data, the step of: storing the padding data while varying the data length of the packet data if a remaining data length obtained by subtracting the data length of the pack header, the data length of the PES header and the data length of the packet data from the data length of an (n−1)th sector of the plurality of sectors is smaller than a data length obtained by adding a predetermined data length to the data length of the PES header.

A recording device according to the present invention comprises: a prediction unit for, when packeting and recording content data supplied to a recording medium having a plurality of sectors made up of at least a header and packet data, predicting whether or not a remaining data length of the last sector of the plurality of sectors to which the packeted content data is recorded is smaller than the data length of the header; a supplementary data generation unit for generating supplementary data equivalent to the remaining data length of the last sector on the basis of an output from the prediction unit; an encoding processing unit for adding the supplementary data generated by the supplementary data generation unit to the content data and packeting the content data; and a recording unit for recording an output from the encoding processing unit to the recording medium.

The prediction unit divides the data length of the packeted content data by the data length of the packet data to find a quotient and the remainder, and compares the result of subtraction of the found remainder from the data length of the packet data with the data length of the header.

A recording device according to the present invention comprises: a prediction unit for, when packeting and recording content data supplied to a recording medium having a plurality of sectors made up of at least a pack header, a PES (packetized elementary stream) header, packet data and padding data, predicting whether or not a remaining data length obtained by subtracting the data length of the pack header, the data length of the PES header and the data length of the packet data from the data length of an (n−1)th sector of the plurality of sectors is smaller than a data length obtained by adding a predetermined data length to the data length of the PES header; an encoding processing unit for, when encoding the supplied content data and packeting the encoded data, storing the padding data while varying the data length of the packet data on the basis of an output from the prediction unit; and a recording unit for recording output data from the encoding processing unit to the recording medium.

In the recording device according to the present invention, if the prediction unit determines that the remaining data length obtained by subtracting the data length of the pack header, the data length of the PES header and the data length of the packet data from the data length of the (n−1)th sector of the plurality of sectors is larger than the data length obtained by adding the predetermined data length to the data length of the PES header, the content data is packeted and recorded without varying the data length of the packet data by the encoding processing unit.

A recording medium according to the present invention is adapted for recording packeted data. The recording medium has a plurality of sectors made up of at least a header and packet data. When packeting content data and recording the packeted content data, if a remaining data length of the last sector of the plurality of sectors to which the packeted content data is recorded is smaller than the data length of the header, supplementary data equivalent to the remaining data length of the last sector is generated and data obtained by adding the generated supplementary data to the content data and packeting the content data is recorded.

A data outputting method according to the present invention is adapted for packeted data. The outputting method comprises, when packeting content data into a plurality of packs made up of at least a header and packet data and outputting the packeted content data, the steps of: generating supplementary data equivalent to a remaining data length of the last pack of the plurality of packs to which the packeted content data is stored if the remaining data length of the last pack is smaller than the data length of the header; and outputting data obtained by adding the generated supplementary data to the content data and then packeting the content data.

Another data outputting method according to the present invention comprises, when packeting content data to a plurality of packs made up of at least a pack header, a PES (packetized elementary stream) header, packet data and padding data and outputting the packeted content data, the steps of: storing and outputting the padding data while varying the data length of the packet data if a remaining data length obtained by subtracting the data length of the pack header, the data length of the PES header and the data length of the packet data from the data length of an (n−1)th pack of the plurality of packs is smaller than a data length obtained by adding a predetermined data length to the data length of the PES header.

The other objects of the present invention and specific advantages provided by the present invention will be clarified further from the description of embodiments, which will explained hereinafter with reference to the drawings.

BEST MODE FOR CARRYING OUT THE INVENTION

A recording medium, a data recording device and method, and a data transmission device and method to which the present invention is applied will now be described with reference to the drawings.

Figure 2A:
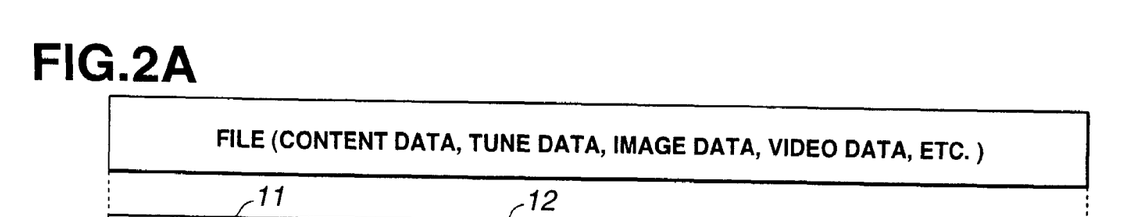
FIGS. 2A to 2D are views for explaining an MPEG2 data structure to which the present invention is applied.
Figure 2B:
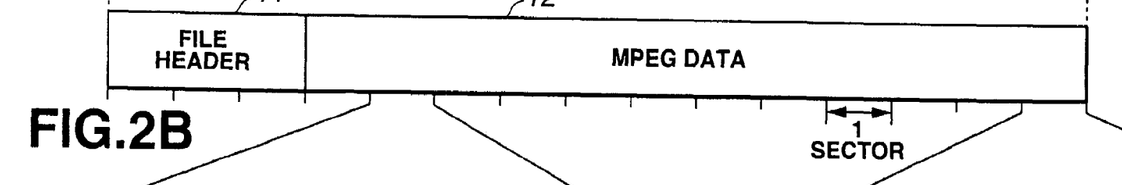

First, a recording medium to which the present invention is applied is a disc-shaped recording medium such as an optical disc, a magneto-optical disc or a magnetic disk, and has a plurality of sectors each having a sector length of 2048 bytes, as shown in FIGS. 2A to 2D. When recording a set of data made up of one of audio data, dynamic image data and the like or a combination of these, that is, content data, as a file to an optical disc, as shown in FIG. 2A, the data is recorded to the recording medium as data constituted by a file header area 11 made up of a plurality of sectors in which a file header is stored and an MPEG data area 12 following this file header area 11 and using a plurality of sectors in which MPEG data obtained by encoding the content data, for example, in accordance with the MPEG2 system, as shown in FIG. 2B.

In the file header, data for managing the content data which is divided into a plurality of sectors and thus stored, and control data for controlling encryption of the content data are stored.

Figure 2C:
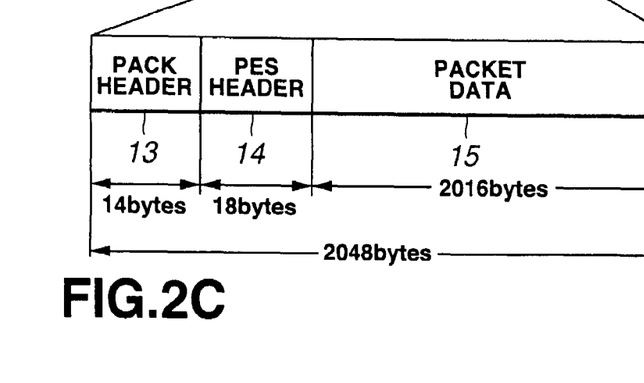

One sector constituting the MPEG data area 12 will be described. As shown in FIG. 2C, one sector is made up of one pack. One pack is constituted by a pack header area 13 in which a pack header is stored, a PES header area e14 in which PES is stored, and a packet data area 15 in which packeted content data is stored.

The pack header area 13 has, for example, 14 bytes. In the pack header area 13, a pack start code indicating the starting position of the pack header, an identification code for identifying MPEG2 from other MPEG, a system clock reference value (SCR) for calibrating a STC (system time clock) value as a time reference value to an intended value at the time of decoding, and data related to the bit rate of the whole pack are stored.

The PES header area 14 has, for example, 18 bytes. In the PES header area 14, the type of the data, that is, stream ID indicating whether the data is audio data or dynamic image data, PES header length, control data for controlling encryption of the content data, and time management information (PTS) are stored.

The packet data area 15 has, for example, 2016 bytes. In the packet data area 15, the packeted content data is stored. The data stored in the packet data area 15 is encrypted on the basis of the control data for controlling the encryption stored in the file header area 11 and the PES header area 14.

Figure 2D:
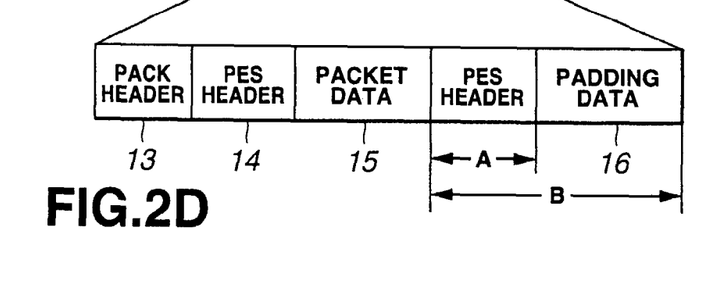

The last sector, in which the last part of the content data is stored, is constituted by a pack header area 13 of 14 bytes, a PES header area 14 of 18 bytes, a packet data area 15 in which packeted data of the last part of the content data is stored, a PES header area 14 of 18 bytes following the packet data area 15, and a padding data area 16 which follows the PES header area 14 and in which padding data is stored, as shown in FIG. 2D.

The padding data has a variable data length. Specifically, its data length is varied in accordance with the data length of the packet data area 15 in which the packeted data of the last part of the content data is stored. This padding data has no meaningful code.

The above-described data structure has a fixed length by not encrypting the areas for storing various control data such as the file header area 11, and the pack header area 13 and the PES header area 14 of the MPEG data area 12. That is, the stuffing data with variable length, described with reference to FIGS. 1A to 1F, is not stored. By not encrypting these areas and thus having a fixed length, control at the time of reproduction such as control of decryption can be easily carried out.

Meanwhile, when the packet data area 15 ends at the end of the last sector, it may be impossible to provide the PES header area 14 and the padding data area 16 after the packet data area 15. Specifically, when the remaining data length B as a result of subtracting the pack header area 13, the PES header area 14 and the packet data area 15 from the data length of the sector is not more than the data length A (18 bytes) of the PES header area 14 following the packet data area 15, as shown in FIG. 2D, for example, when the remaining data length B is not more than a data length found by adding a data length necessary for the padding data, for example, at least 1 byte, to the data length A of the PES header area 14, the PES header area and the padding data area 16 cannot be provided.

Such a situation occurs when the data length of the packeted content data (N bytes) over the data length of the packet data area 15 (2016 bytes) is calculated to find a quotient "i" and the remainder "j" and a value obtained by subtracting the remainder "j" from 2016 is smaller than the data length A of the PES header area 14.

In such a case, in the recording medium to which the present invention is applied, generation of a blank space the sector where no data is stored is prevented by adding supplementary data the last part of the content data.

Figure 3:
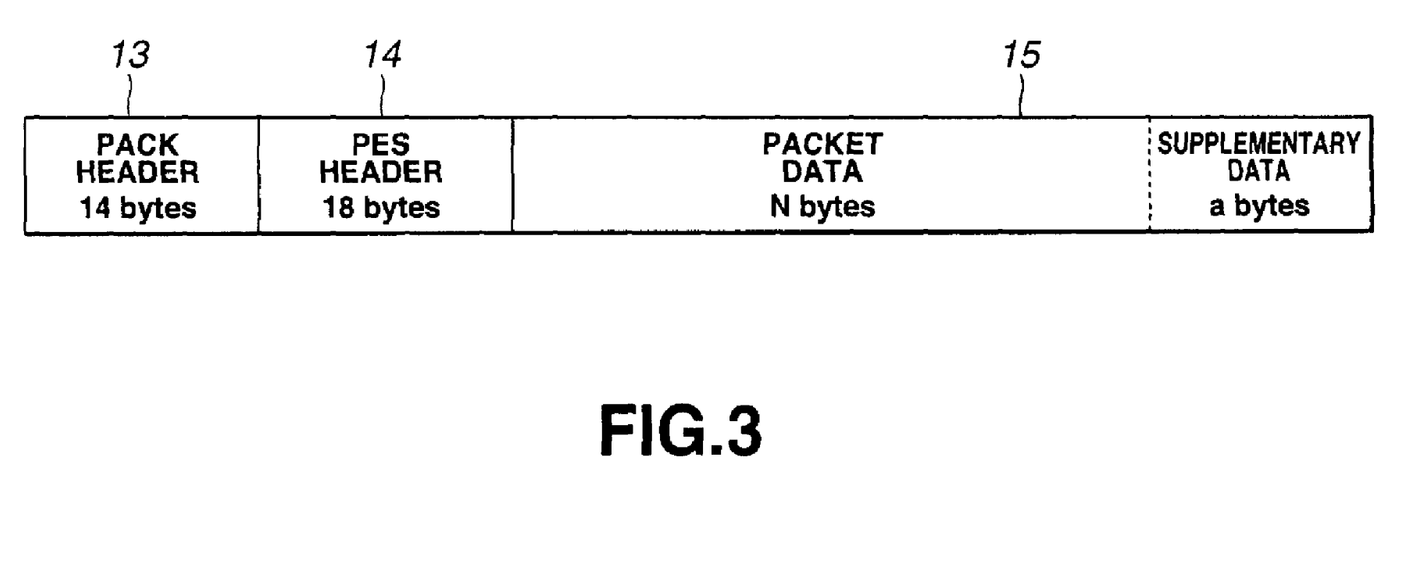
FIG. 3 is a view for explaining an example in which supplementary data is added to packet data recorded in the last sector.

Specifically, as shown in FIG. 3, packet data of N+a bytes, obtained by adding supplementary data of a bytes to the last packet data of N bytes of the content data, that is, packet data of 2016 bytes, is stored in the last sector.

If the content data is audio data, the supplementary data added to the last part of the content data is silent data which is not perceptible to human ears. If the content data is dynamic image data, the supplementary data is redundant image data such as image data made up of a single color (for example, blue) or last frame data.

As described above, in the recording medium to which the present invention is applied, the need to add the padding data is eliminated by adding the supplementary to the last part of the content data, even if the content data ends immediately before a sector boundary.

A data recording device and recording method which enable recording of the above-described content data to a recording medium will now be described with reference to the drawings.

Figure 4:
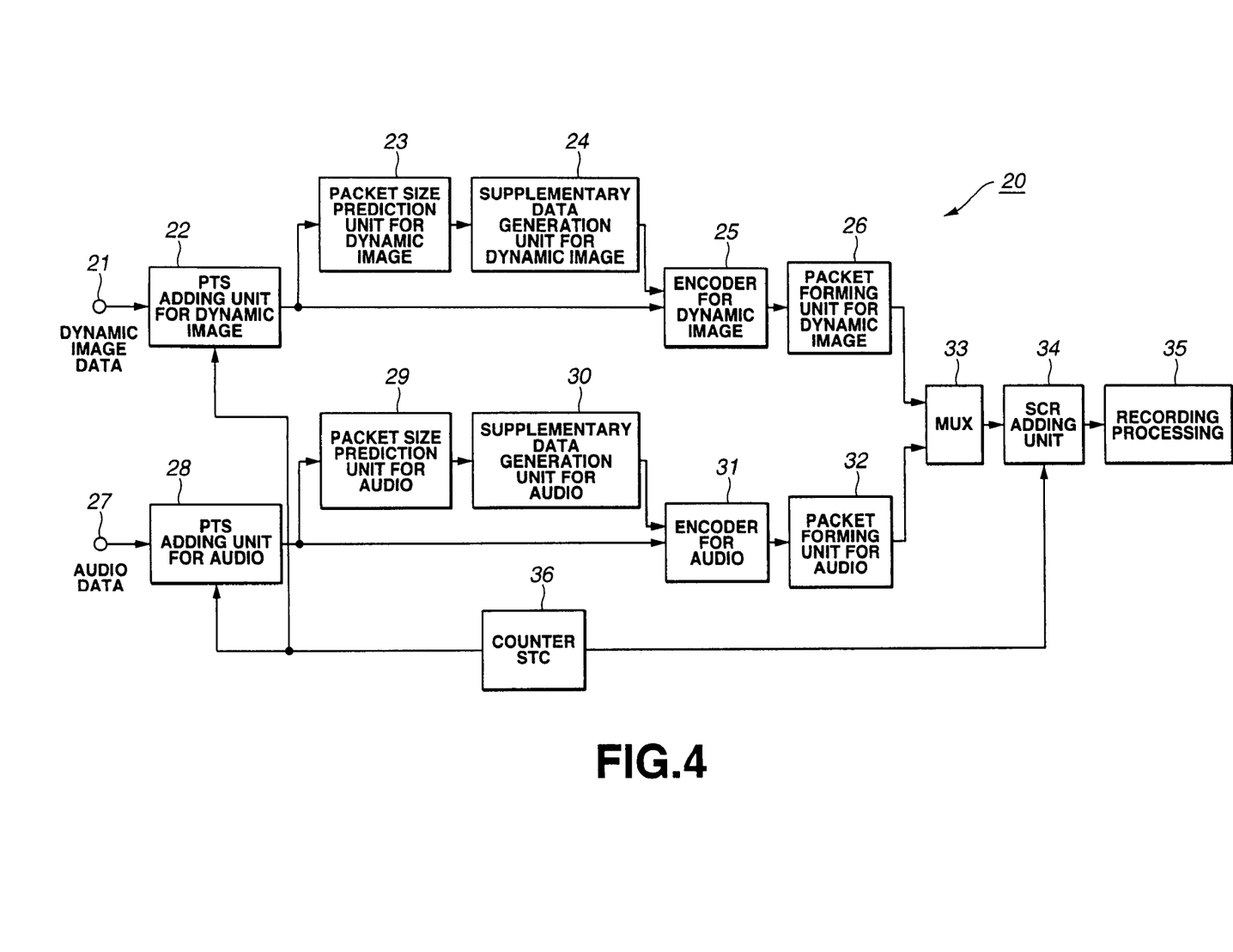
FIG. 4 is a block diagram for explaining a data recording device for recording data with the data structure shown in FIG. 3 to a recording medium.

In order to process dynamic image data which constitutes content data, a data recording device 20 to which the present invention is applied has the following units: a PTS adding unit 22 for adding PTS to dynamic image data inputted from an input terminal 21; a packet size prediction unit 23 for predicting the data length in the case where the dynamic image data is packeted; a supplementary data generation unit 24 for generating supplementary data on the basis of the data length in the case where the dynamic image data is packeted, predicted by the packet size prediction unit 23; an encoder 25 for encoding the dynamic image data in accordance with the MPEG2 system; and a packet forming unit 26 for packeting the encoded dynamic image data, as shown in FIG. 4.

In order to process audio data which constitutes content data, the data recording device 20 also has the following units: a PTS adding unit 28 for adding PTS to audio data inputted from an input terminal 27; a packet size prediction unit 29 for predicting the data length in the case where the audio data is packeted; a supplementary data generation unit 30 for generating supplementary data on the basis of the data length in the case where the audio data is packeted, predicted by the packet size prediction unit 29; an encoder 31 for encoding the audio data in accordance with the MPEG2 system; and a packet forming unit 32 for packeting the encoded audio data.

The data recording device 20 also has a multiplexer 33 for multiplexing the dynamic image data outputted from the packet forming unit 26 and the audio data outputted from the packet forming unit 32, an SCR adding unit 34 for adding SCR to the content data multiplexed by the multiplexer 33, a recording processing unit 35 for recording the data to a recording medium, and a counter 36 for generating STC as a synchronizing signal; which will be a time reference for reproduction.

The PTS adding unit 22 generates time management information (PTS) for reproduction output on the basis of the STC generated by the counter 36 and adds the PTS to the dynamic image data inputted from the input terminal 21. The PTS adding unit 22 outputs the dynamic image data with the PTS added thereto to the packet size prediction unit 23 and the encoder 25.

The packet size prediction unit 23 calculates the data length of the packeted content data (N bytes) over the data length of the packet data area 15 (2016 bytes) to find a quotient "i" and the remainder "j", and determines whether or not a value found by subtracting the remainder "j" from 2016 is smaller than the data length A of the PES header area 14, as shown in FIGS. 2A to 2D. If the value found by subtracting the remainder "j" from 2016, which is the data length of the packet data area 15, is smaller than the data length A of the PES header area 14, the packet size prediction unit 23 outputs this value obtained as a result of subtraction to the supplementary data generation unit 24 as the data length of supplementary data because padding data cannot be stored in the same sector. If the value obtained as a result of subtraction is larger than the data length A of the PES header area 14, the packet size prediction unit 23 outputs data indicating that supplementary data is "0" to the supplementary data generation unit 24 because padding data can be stored in the same sector.

As the data length of supplementary data is inputted to the supplementary data generation unit 24 from the packet size prediction unit 23, the supplementary data generation unit 24 generates redundant image data as supplementary data with this data length and outputs this supplementary data to the encoder 25.

As the supplementary data is inputted to the encoder 25 from the supplementary data generation unit 24, the encoder 25 adds this supplementary data to the last part of the dynamic image data. When the supplementary data is inputted from the supplementary data generation unit 24, the encoder 25 compresses the dynamic image data with the supplementary data added thereto, in accordance with the so-called MPEG2 standard. When no supplementary data is inputted from the supplementary data generation unit 24, the encoder 25 compresses the dynamic image data inputted from the PTS adding unit 22, in accordance with the MPEG2 standard. Specifically, the encoder 25 carries out motion compensation prediction coding in order to compress the dynamic image data with reduced redundancy in the direction of the time base of the dynamic image data, and then carries out DCT (discrete cosine transform), quantization and variable-length coding in order to compress the dynamic image data with reduced redundancy in the direction of the spatial base. Then, the encoder 25 outputs the quantized dynamic image data to the packet forming unit 26.

The packet forming unit 26 packets the dynamic image data which was encoded by the encoder 25 in accordance with the MPEG2 standard. The packet forming unit 26 generates padding data. The packet forming unit 26 outputs the packeted dynamic image data and the padding data to the multiplexer 33.

The PTS adding unit 28 generates time management information (PTS) for reproduction output on the basis of the STC generated by the counter 36 and adds the PTS to the audio data inputted from the input terminal 27. The PTS adding unit 28 outputs the audio data with the PTS added thereto, to the packet size prediction unit 29 and the encoder 31.

The packet size prediction unit 29 calculates the data length of the packeted content data (N bytes) over the data length of the packet data area 15 (2016 bytes) to find a quotient "i" and the remainder "j", and determines whether or not a value found by subtracting the remainder "j" from 2016 is smaller than the data length A of the PES header area 14. If the value found by subtracting the remainder "j" from 2016, which is the data length of the packet data area 15, is smaller than the data length A of the PES header area 14, the packet size prediction unit 29 outputs this value obtained as a result of subtraction to the supplementary data generation unit 30 as the data length of supplementary data because padding data cannot be stored in the same sector. If the value obtained as a result of subtraction is larger than the data length A of the PES header area 14, the packet size prediction unit 29 outputs data indicating that supplementary data is "0" to the supplementary data generation unit 30 because padding data can be stored in the same sector.

As the data length of supplementary data is inputted to the supplementary data generation unit 30 from the packet size prediction unit 29, the supplementary data generation unit 30 generates silent data as supplementary data with this data length and outputs this supplementary data to the encoder 31.

As the supplementary data is inputted to the encoder 31 from the supplementary data generation unit 30, the encoder 31 adds this supplementary data to the last part of the audio data. When the supplementary data is inputted from the supplementary data generation unit 30, the encoder 31 compresses the audio with the supplementary data added thereto, in accordance with the so-called MPEG2 standard. When no supplementary data is inputted from the supplementary data generation unit 30, the encoder 31 compresses the audio data in accordance with the MPEG2 standard. Specifically, the encoder 31 carries out subband coding of the audio data, then blocks the data, and carries out adaptive bit allocation and quantization using a psychoacoustic mode. The encoder 31 outputs the quantized audio data to the packet forming unit 32.

The packet forming unit 32 packets the audio data which was encoded by the encoder 31 in accordance with the MPEG2 standard. The packet forming unit 32 generates padding data. The packet forming unit 32 outputs the packeted audio data and the padding data to the multiplexer 33.

To the multiplexer 33, the packeted dynamic image data is inputted from the packet forming unit 26 and also the packeted audio data is inputted from the packet forming unit 32. Moreover, the padding data are inputted to the multiplexer 33 from the packet forming units 26, 32. The multiplexer 33 performs time division of the packeted dynamic image data and audio data and adds a PES header or the like to each packet. The multiplexer 33 switches the packets of the dynamic image data and the packets of the audio data, that is, multiplexes the dynamic image data and the audio data, so that the dynamic image data and the audio data can be reproduced synchronously. The multiplexer 33 then outputs the multiplexed data to the SCR adding unit 34.

The SCR adding unit 34 adds a system clock reference value (SCR) to the pack header of the packet inputted from the multiplexer 33 on the basis of the STC generated by the counter 36. The SCR adding unit 34 outputs the packet with the SCR added thereto, to the recording processing unit 35.

The recording processing unit 35 performs modulation processing such as 8-14 modulation or 8-16 modulation and error correction processing such as CIRC (cross interleave Reed-Solomon code) so that the data can be recorded to a recording medium. The recording processing unit 35 then records the data to the recording medium by using recording means such as an optical pickup.

The operation of the above-described data recording device 20 will now be described. When dynamic image data and audio data constituting content data are inputted to the PTS adding units 22, 28 from the input terminals 21, 27, the PTS adding units 22, 28 generate PTS based on STC, then add the PTS to the respective data, and output the data to the packet size prediction units 23, 29 and the encoders 25, 31.

Figure 5:
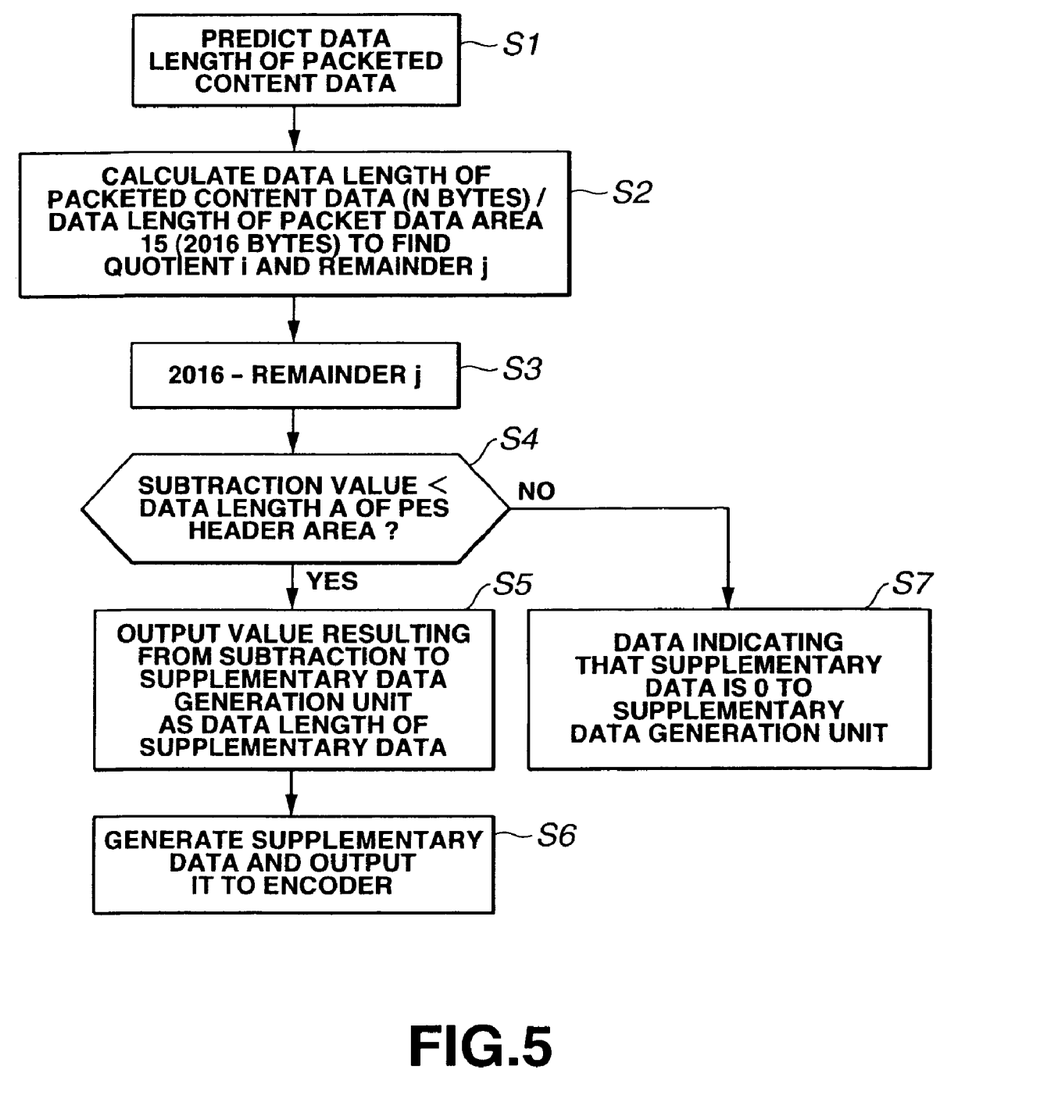
FIG. 5 is a flowchart for explaining a data recording method using the device shown in FIG. 4.

As shown in FIG. 5, at step S1, the packet size prediction units 23, 29 calculate how many bytes the whole data have when content data is packeted. Next, at step S2, the packet size prediction units 23, 29 calculate the data length of the packeted content data (N bytes) over the data length of the packet data area 15 (2016 bytes) to find a quotient "i" and the remainder "j". At step S3, the packet size prediction units 23, 29 subtract the remainder "j" from 2016, which is the data length of the sector. At step S4, the packet size prediction units 23, 29 determine whether the value resulting from the subtraction is smaller than the data length A of the PES header area 14 or not. If the value is smaller than the data length A of the PES header area 14, the packet size prediction units 23, 29 proceed to step S5. If the value is larger than the data length A of the PES header area 14, the packet size prediction units 23, 29 proceed to step S7.

At step S5, the packet size prediction units 23, 29 output the value resulting from the subtraction of step S4 to the supplementary data generation units 24, 30 as the data length of supplementary data, since padding data cannot be stored within the same sector. At step S6, the supplementary data generation units 24, 30 output supplementary data with the data length equivalent to the value resulting from the subtraction of step S4, inputted from the packet size prediction units 23, 29, that is, the silent data for the audio data and the above-described redundant dynamic image data for the dynamic image data, to the encoders 25, 31.

At step S7, the packet size prediction units 23, 29 output data indicating that supplementary data is "0" to the supplementary data generation units 24, 30, since padding data can be stored within the same sector. Therefore, in this case, the supplementary data generation units 24, 30 generate no supplementary data.

When the supplementary data is inputted to the encoders 25, 31 from the supplementary data generation units 24, 30, the encoders 25, 31 compress the dynamic image data and the audio data with the supplementary data added to the last parts thereof, in accordance with the so-called MPEG2 standard. When no supplementary data is inputted from the supplementary data generation units 24, 30, the encoders 25, 31 compress the dynamic image data and the audio data inputted from the packet size prediction units 23, 29, in accordance with the MPEG2 standard. The encoders 25, 31 output the quantized dynamic image data and audio data to the packet forming units 26, 32. The packet forming units 26, 32 packet the dynamic image data and the audio data which were encoded by the encoders 25, 31 in accordance with the MPEG2 standard, and outputs the packeted dynamic image data and audio data to the multiplexer 33. The multiplexer 33 performs time division of the packeted dynamic image data, audio data and the like, and adds a PES header or the like to each packet. The multiplexer 33 multiplexes the packets of the dynamic image data and the packets of the audio data so that the dynamic image data and the audio data can be reproduced synchronously. The multiplexer 33 then outputs the multiplexed data to the SCR adding unit 34. The SCR adding unit 34 adds a system clock reference value (SCR) to the pack header of the packets inputted from the multiplexer 33 on the basis of the STC generated by the counter 36. The recording processing unit 35 performs modulation processing and error correction processing so as to enable recording of the data to a recording medium, and records the data to the recording medium by using recording means such as an optical pickup.

With the data recording device 20 as described above, padding data can be stored into the next sector by adding the supplementary data to the last part of the content data even when the content data ends immediately before a sector boundary.

In the above-described case, the supplementary data is added to the last part of the content data stored in the last sector, as shown in FIG. 3. However, the supplementary data may be added to the leading part of the leading packet data of the content data. In the above-described case, the presence/absence of the supplementary data and the data length of the supplementary data are found by calculating how many bytes the whole data has when the content data is packeted. However, the presence/absence of the supplementary data and the data length of the supplementary data may be found by storing the packeted content data in the order of sectors and then calculating remaining data length of the last sector.

In a data transmission device for transmitting the content data with the supplementary data added thereto, a communication unit constituted by a communication circuit and an antenna for communicating output data from the SCR adding unit 34 to another data transmission device is provided in place of the recording processing unit 35 shown in FIG. 4. With this data transmission device, such content data having the supplementary data added to the last packet can be transmitted to another data transmission device.

As described above, if the packet data area 15 ends at the end of the last sector and the PES header area 14 and the padding data area 16 cannot be provided after the packet data area 15, the packet data area 15 of the preceding or current sector is shortened so that the PES header area 14 and the padding data area 16 can be provided after the packet data area 15, and the remaining packet data area 15 may be provided in the next sector.

Specifically, when the remaining data length B of the sector as a result of subtracting the pack header area 13, the PES header area 14 and the packet data area 15 from the data length of the sector is not more than the data length A (18 bytes) of the PES header area 14 following the packet data area 15, as shown in FIG. 2D, for example, when the remaining data length B is not more than a data length found by adding a data length necessary for the padding data, for example, at least 1 byte, to the data length A of the PES header area 14, the PES header area and the padding data area 16 cannot be provided.

Such a situation occurs when the data length of the packeted content data (N bytes) over the data length of the packet data area 15 (2016 bytes) is calculated to find a quotient "i" and the remainder "j" and a value obtained by subtracting the remainder "j" from 2016 is smaller than the data length A of the PES header area 14.

Figure 6:
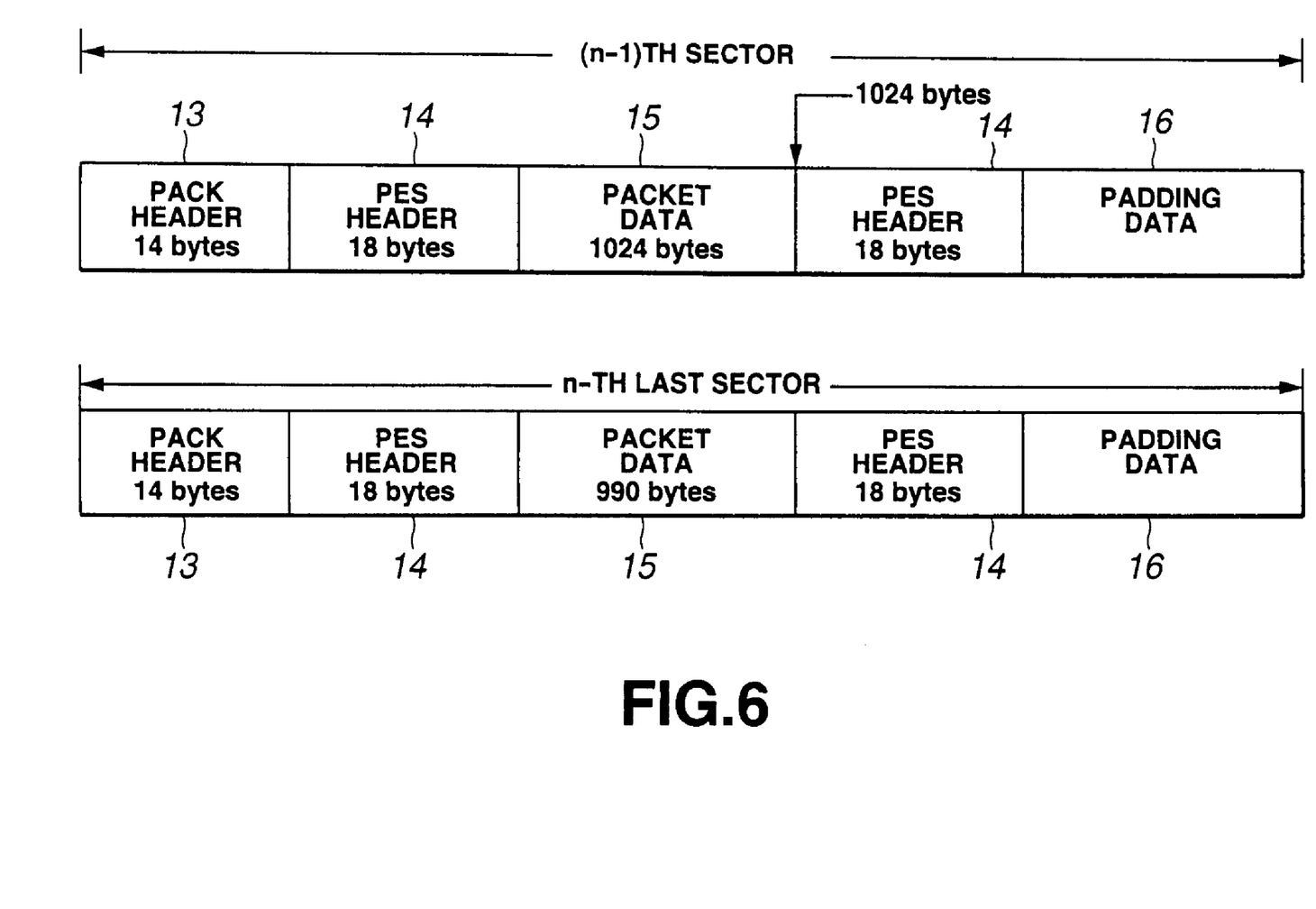
FIG. 6 is a view for explaining a data structure when recording the last part of content data over two sectors.

Thus, in a recording medium to which the present invention is applied, packet data with a predetermined length, for example, 1024 bytes, is stored in an (n−1)th sector, which precedes the n-th last sector by one, and a PES header is stored next, followed by padding-data, as shown in FIG. 6. In the n-th last sector, a pack header is stored at its leading part, followed by a PES header. Then, packet data following the packet data stored in the (n−1)th sector is stored, followed by a PES header and padding data. That is, in this recording medium, when packet data of the last part of the content data can be stored in the (n−1)th sector but padding data cannot be stored, this packet data is shortened to a predetermined length, for example, 1024 bytes, and the remaining packet data, that is, packet data with a length of (991-PES header length A) to 991 bytes, can be stored. Thus, padding data can be stored in the (n−1)th sector.

In this recording medium, as the data length of the packet data in the (n−1)th sector is set to a predetermined length, the presence of the packet data and the padding data in the next sector, that is, the n-th last sector, can be easily identified.

A data recording device and recording method which enables recording of content data to a recording medium as described above will now be described with reference to the drawings.

Figure 7:
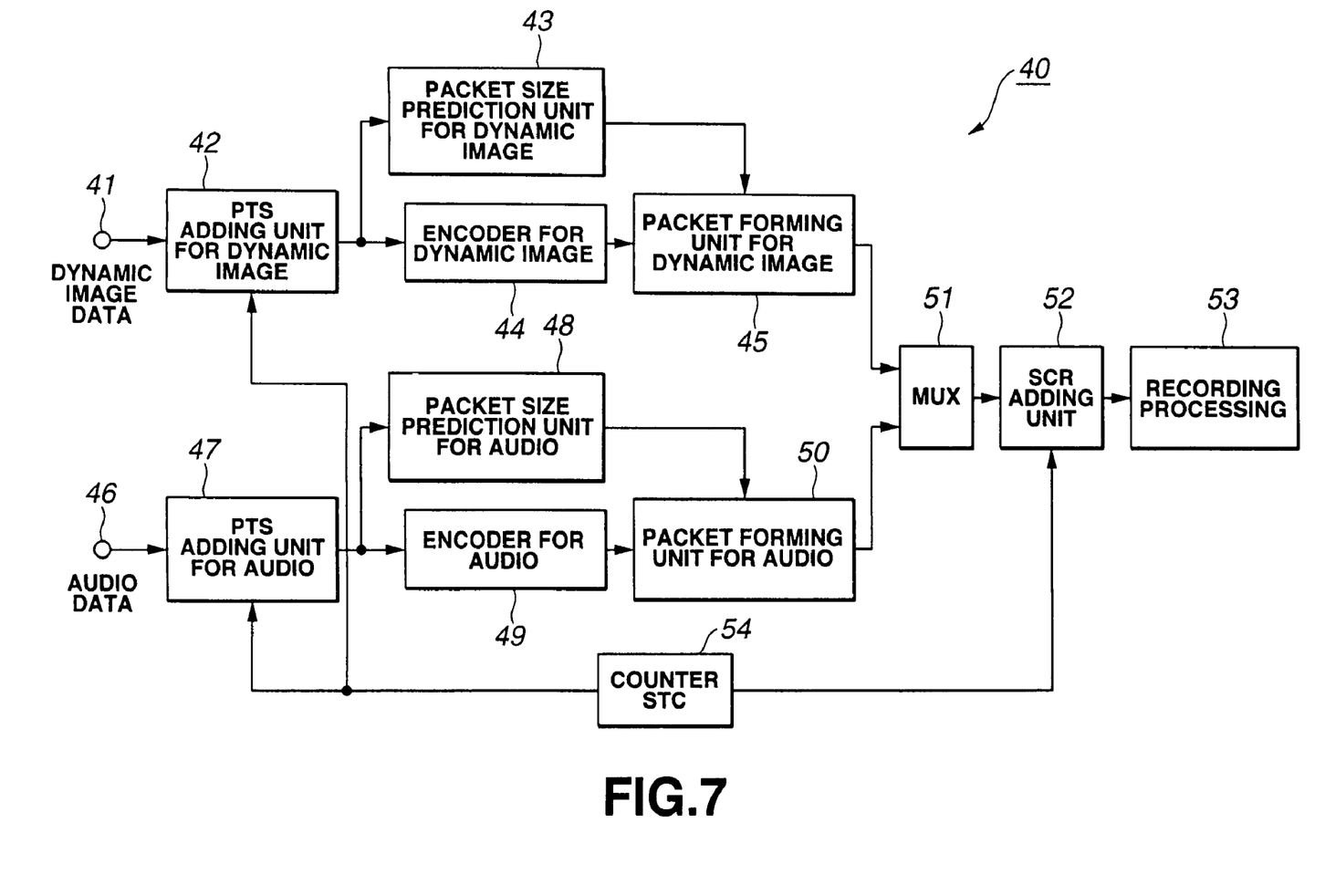
FIG. 7 is a block diagram for explaining a data recording device for recording data with the data structure shown in FIG. 6 to a recording medium.

In order to process dynamic image data which constitutes content data, a data recording device 40 to which the present invention is applied has the following units: a PTS adding unit 42 for adding PTS to dynamic image data inputted from an input terminal 41; a packet size prediction unit 43 for predicting the data length in the case where the dynamic image data is packeted; an encoder 44 for encoding the dynamic image data in accordance with the MPEG2 system; and a packet forming unit 45 for packeting the encoded dynamic image data and padding data, as shown in FIG. 7.

In order to process audio data which constitutes content data, the data recording device 40 also has the following units: a PTS adding unit 47 for adding PTS to audio data inputted from an input terminal 46; a packet size prediction unit 48 for predicting the data length in the case where the audio data is packeted; an encoder 49 for encoding the audio data in accordance with the MPEG2 system; and a packet forming unit 50 for packeting the encoded audio data.

The data recording device 40 also has a multiplexer 51 for multiplexing the dynamic image data outputted from the packet forming unit 45 and the audio data outputted from the packet forming unit 50, an SCR adding unit 52 for adding SCR to the content data multiplexed by the multiplexer 51, a recording processing unit 53 for recording the data to a recording medium, and a counter 54 for generating STC as a synchronizing signal, which will be a time reference for reproduction.

The PTS adding unit 42 generates time management information (PTS) for reproduction output on the basis of the STC generated by the counter 54 and adds the PTS to the dynamic image data inputted from the input terminal 41. The PTS adding unit 42 outputs the dynamic image data with the PTS added thereto to the packet size prediction unit 43 and the encoder 44.

The packet size prediction unit 43 calculates the data length of the packeted content data (N bytes) over the data length of the packet data area 15 (2016 bytes) to find a quotient "i" and the remainder "j", and determines whether or not a value found by subtracting the remainder "j" from 2016 is smaller than the data length A of the PES header area 14, as shown in FIGS. 2A to 2D. If the value found by subtracting the remainder "j" from 2016, which is the data length of the packet data area 15, is smaller than the data length A of the PES header area 14, the packet size prediction unit 43 outputs data indicating that padding data cannot be stored within the same sector, to the packet forming unit 45. If the value obtained as a result of subtraction is larger than the data length A of the PES header area 14, the packet size prediction unit 43 outputs to the packet forming unit 45 data indicating that normal encoding processing is to be carried out because padding data can be stored within the same sector.

The encoder 44 compresses the dynamic image data inputted from the PTS adding unit 42 in accordance with the so-called MPEG2 standard. Specifically, the encoder 44 carries out motion compensation prediction coding in order to compress the dynamic image data with reduced redundancy in the direction of the time base of the dynamic image data, and then carries out DCT, quantization and variable-length coding in order to compress the dynamic image data with reduced redundancy in the direction of the spatial base. Then, the encoder 44 outputs the quantized dynamic image data to the packet forming unit 45.

The packet forming unit 45 sequentially packets the quantized dynamic image data inputted from the encoder 44 and generates padding data. When the data indicating that padding data cannot be stored within the same sector is inputted to the packet forming unit 45, the packet forming unit 45 packets the quantized data to be recorded to an (n−1)th sector, with a predetermined data length, that is, 1024 bytes, and packets the remaining data so as to be recorded to the n-th last sector. The packet forming unit 45 performs padding of the packet data to be recorded to the (n−1)th sector and the dynamic image data to be recorded to the n-th last sector. When the data indicating that normal encoding processing is to be carried out is inputted to the packet forming unit 45, the packet forming unit 45 sequentially packets the quantized dynamic image data and then performs padding. The packet forming unit 45 outputs the packeted dynamic image data to the multiplexer 51.

The PTS adding unit 47 generates time management information (PTS) for reproduction output on the basis of the STC generated by the counter 54 and adds the PTS to the audio data inputted from the input terminal 41. The PTS adding unit 47 outputs the audio data with the PTS added thereto, to the packet size prediction unit 48 and the encoder 49.

The packet size prediction unit 48 calculates the data length of the packeted content data (N bytes) over the data length of the packet data area 15 (2016 bytes) to find a quotient "i" and the remainder "j", and determines whether or not a value found by subtracting the remainder "j" from 2016 is smaller than the data length A of the PES header area 14. If the value found by subtracting the remainder "j" from 2016, which is the data length of the packet data area 15, is smaller than the data length A of the PES header area 14, the packet size prediction unit 48 outputs data indicating that padding data cannot be stored within the same sector, to the packet forming unit 50. If the value obtained as a result of subtraction is larger than the data length A of the PES header area 14, the packet size prediction unit 48 outputs to the packet forming unit 50 data indicating that normal encoding processing is to be carried out because padding data can be stored within the same sector.

The encoder 49 compresses the audio inputted from the PTS adding unit 47 in accordance with the so-called MPEG2 standard. Specifically, the encoder 49 carries out subband coding of the audio data, then blocks the data, and carries out adaptive bit allocation and quantization using a psychoacoustic mode. The encoder 49 outputs the quantized audio data to the packet forming unit 50.

The packet forming unit 50 sequentially packets the quantized audio data inputted from the encoder 39 and generates padding data. When the data indicating that padding data cannot be stored within the same sector is inputted to the packet forming unit 50, the packet forming unit 50 packets the quantized data to be recorded into the (n−1)th sector, with a predetermined data length, that is, 1024 bytes, and packets the remaining data so as to be recorded into the n-th last sector. The packet forming unit 50 performs padding of the packet data to be recorded to the (n−1)th sector and the audio data to be recorded to the n-th last sector.

When the data indicating that normal encoding processing is to be carried out is inputted to the packet forming unit 50, the packet forming unit 50 sequentially packets the quantized audio data and then performs padding. The packet forming unit 50 outputs the packeted audio data to the multiplexer 51.

To the multiplexer 51, the packeted dynamic image data is inputted from the packet forming unit 45 and also the packeted audio data is inputted from the packet forming unit 50. Moreover, the padding data are inputted to the multiplexer 51 from the packet forming units 45, 50. The multiplexer 51 performs time division of the packeted dynamic image data, audio data and padding data, and adds a PES header or the like to each packet. The multiplexer 51 switches the packets of the dynamic image data and the packets of the audio data, that is, multiplexes the dynamic image data and the audio data, so that the dynamic image data and the audio data can be reproduced synchronously. The multiplexer 51 then outputs the multiplexed data to the SCR adding unit 52.

The recording processing unit 53 performs modulation processing such as 8-14 modulation or 8-16 modulation and error correction processing such as CIRC so that the data can be recorded to a recording medium. The recording processing unit 53 then records the data to the recording medium by using recording means such as an optical pickup.

The operation of the above-described data recording device 40 will now be described. When dynamic image data and audio data constituting content data are inputted to the PTS adding units 42, 47 from the input terminals 41, 46, the PTS adding units 42, 47 generate PTS based on STC, then add the PTS to the respective data, and output the data to the packet size prediction units 43, 38 and the encoders 44, 49.

When the dynamic image data and the audio data are inputted to the encoders 44, 49 from the PTS adding unit 42, 47, the encoders 44, 49 compress the inputted data in accordance with the so-called MPEG2 standard. The encoders 44, 49 output the quantized dynamic image data and audio data to the packet forming units 45, 50.

Figure 8:
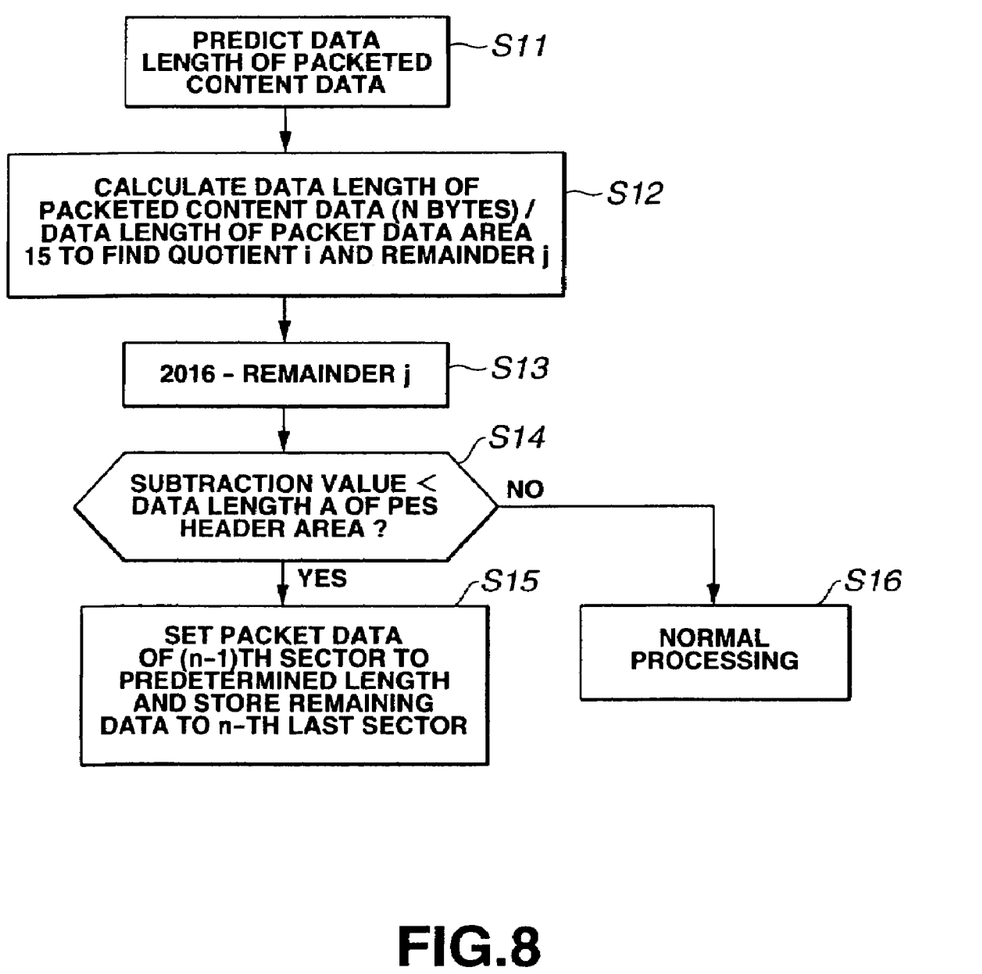
FIG. 8 is a flowchart for explaining a data recording method using the device shown in FIG. 7.

As shown in FIG. 8, at step S11, the packet size prediction units 43, 48 calculate how many bytes the whole data have when content data is packeted. Next, at step S12, the packet size prediction units 43, 48 calculate the data length of the packeted content data (N bytes) over the data length of the packet data area 15 (2016 bytes) to find a quotient "i" and the remainder "j". At step S13, the packet size prediction units 43, 48 subtract the remainder "j" from 2016, which is the data length of the sector. At step S14, the packet size prediction units 43, 48 determine whether the value resulting from the subtraction is smaller than the data length A of the PES header area 14 or not. If the value is smaller than the data length A of the PES header area 14, the packet size prediction units 43, 48 outputs data indicating that padding data cannot be stored within the same sector, to the packet forming units 45, 50. If the value is larger than the data length A of the PES header area 14, the packet size prediction units 43, 48 output data indicating that normal encoding processing is to be carried out, to the packet forming units 45, 50.

When the data indicating that padding data cannot be stored within the same sector is inputted to the packet forming units 45, 50, the packet forming units 45, 50 at step S15 packet the quantized data to be recorded to the (n−1)th sector, with a predetermined data length, that is, 1024 bytes, and packets the remaining data so as to be recorded to the n-th last sector. The packet forming units 45, 50 perform padding of the packet data to be recorded to the (n−1)th sector and the data to be recorded to the n-th last sector. The packet forming units 45, 50 output the packeted dynamic image data and audio data to the multiplexer 51.

When the data indicating that normal encoding processing is to be carried out is inputted to the packet forming units 45, 50, the packet forming units 45, 50 at step S16 sequentially packet the quantized dynamic image data and audio data and perform padding. The packet forming units 45, 50 output the packeted dynamic image data and audio data to the multiplexer 51.

The multiplexer 51 performs time division of the packeted dynamic image data and audio data and adds a PES header or the like to each packet. The multiplexer 51 multiplexes the packets of the dynamic image data and the packets of the audio data so that the dynamic image data and the audio data can be reproduced synchronously. The multiplexer 51 then outputs the multiplexed data to the SCR adding unit 52. The SCR adding unit 53 adds a system clock reference value (SCR) to the pack header of the packets inputted from the multiplexer 51 on the basis of the STC generated by the counter 54. The recording processing unit 53 performs modulation processing and error correction processing so as to enable recording of the data to a recording medium, and records the data to the recording medium by using recording means such as an optical pickup.

With the data recording device 40 as described above, the packet data area 15 is shortened and the remaining packet data area 15 is provided in the next sector so that the PES header area 14 and the padding data area 16 can be provided after the packet data area 15 even when the content data ends immediately before a sector boundary. Thus, padding can be performed regardless of the length of the content data.

In a data transmission device, a communication unit constituted by a communication circuit and an antenna for communicating output data from the SCR adding unit 52 to another data transmission device is provided in place of the recording processing unit 53 shown in FIG. 7. With this data transmission device, securely padded data can be transmitted to another data transmission device.

Whether or not the last part of the content data can be padded is determined by calculating how many bytes the whole data has when the content data is packeted. However, whether to shift the data to the next sector may be determined by sequentially storing the packeted content data and calculating the remaining data length of the last sector.

In the above description, the MPEG2 system is used as an exemplary compression system for the content data. However, MPEG1 or other systems may also be used.

INDUSTRIAL APPLICABILITY

According to the present invention, in the last sector where the last data of content data is to be recorded, when the remaining data length in the case where pack data is recorded into this last sector is shorter than the data length of the header, the pack data made up of the content data corresponding to the remaining data length with supplementary data added thereto is recorded. Thus, padding need not be performed regardless of the data length of the content data.

Moreover, according to the present invention, in the (n−1)th sector where the last data of content data is to be recorded, when the remaining data length in the case where pack data is recorded in this sector is shorter than the data length of the header, the packet data is shortened so that the remaining data length becomes longer than the data length of the header. Thus padding is made possible.

The invention claimed is:

1. A recording method comprising, when packeting content data and recording the packeted content data to a recording medium having a plurality of sectors made up of at least a header and packet data, the steps of:

generating supplementary data equivalent to a remaining data length of the last sector of the plurality of sectors to which the packeted content data is recorded if the remaining data length of the last sector is smaller than the data length of the header; and adding the generated supplementary data to the content data and packeting the content data, wherein the data length of the packeted content data is divided by the data length of the packet data to find a quotient and the remainder, and the result of subtraction of the found remainder from the data length of the packet data is compared with the data length of the header, thus discriminating whether or not the remaining data length of the last sector is smaller than the data length of the header.

2. The recording method as claimed in claim 1, wherein the result of subtraction of the found remainder from the data length of the packet data is compared with the data length of the header, and when the result of subtraction of the found remainder from the data length of the packet data is smaller than the data length of the header, supplementary data corresponding to the remaining data length of the last sector is generated.

3. A recording method comprising, when packeting content data and recording the packeted content data to a recording medium having a plurality of sectors made up of at least a rack header, a PES (packetized elementary stream) header, packet data and padding data, the steps of:

generating supplementary data equivalent to a remaining data length of the last sector of the plurality of sectors to which the packeted content data is recorded if the remaining data length of the last sector is smaller than at least the data length of the PBS header; and adding the generated supplementary data to the content data and packeting the content data, wherein the data length of the packeted content data is divided by the data length of the packet data to find a quotient and the remainder, and the result of subtraction of the found remainder from the data length of the packet data is compared with the data length of the header, thus discriminating whether or not the remaining data length of the last sector is smaller than the data length of the header.

4. The recording method as claimed in claim 3, wherein the result of subtraction of the found remainder from the data length of the packet data is compared with the data length of the header, and when the result of subtraction of the found remainder from the data length of the packet data is smaller than the data length of the header, supplementary data corresponding to the remaining data length of the last sector is generated.

5. A recording device comprising:

a prediction unit for, when packeting and recording content data supplied to a recording medium having a plurality of sectors made up of at least a header and packet data, predicting whether or not a remaining data length of the last sector of the plurality of sectors to which the packeted content data is recorded is smaller than the data length of the header;

a supplementary data generation unit for generating supplementary data equivalent to the remaining data length of the last sector on the basis of an output from the prediction unit;

an encoding Processing unit for adding the supplementary data generated by the supplementary data generation unit to the content data and packeting the content data; and a recording unit for recording an output from the encoding processing unit to the recording medium, wherein the prediction unit divides the data length of the packeted content data by the data length of the packet data to find a quotient and the remainder, and compares the result of subtraction of the found remainder from the data length of the packet data with the data length of the header.

6. The recording device as claimed in claim 5, wherein the prediction unit compares the result of subtraction of the found remainder from the data length of the packet data with the data length of the header, and when the result of subtraction of the found remainder from the data length of the packet data is smaller than the data length of the header, the prediction unit causes the supplementary data generation unit to generate supplementary data corresponding to the remaining data length of the last sector.

7. A data outputting method comprising, when packeting content data into a plurality of packs made up of at least a header and packet data and outputting the packeted content data, the steps of:

generating supplementary data equivalent to a remaining data length of the last pack of the plurality of packs to which the packeted content data is stored if the remaining data length of the last pack is smaller than the data length of the header; and outputting data obtained by adding the generated supplementary data to the content data and then packeting the content data, wherein the data length of the packeted content data is divided by the data length of the packet data to find a quotient and the remainder, and the result of subtraction of the found remainder from the data length of the packet data is compared with the data length of the header, thus determining whether or not the remaining data length of the last pack is smaller than the data length of the header.

8. The data outputting method as claimed in claim 7, wherein the result of subtraction of the found remainder from the data length of the packet data is compared with the data length of the header, and when the result of subtraction of the found remainder from the data length of the packet data is smaller than the data length of the header, supplementary data equivalent to the remaining data length of the last pack is generated.

* * * * *